Patented Mar. 26, 1935

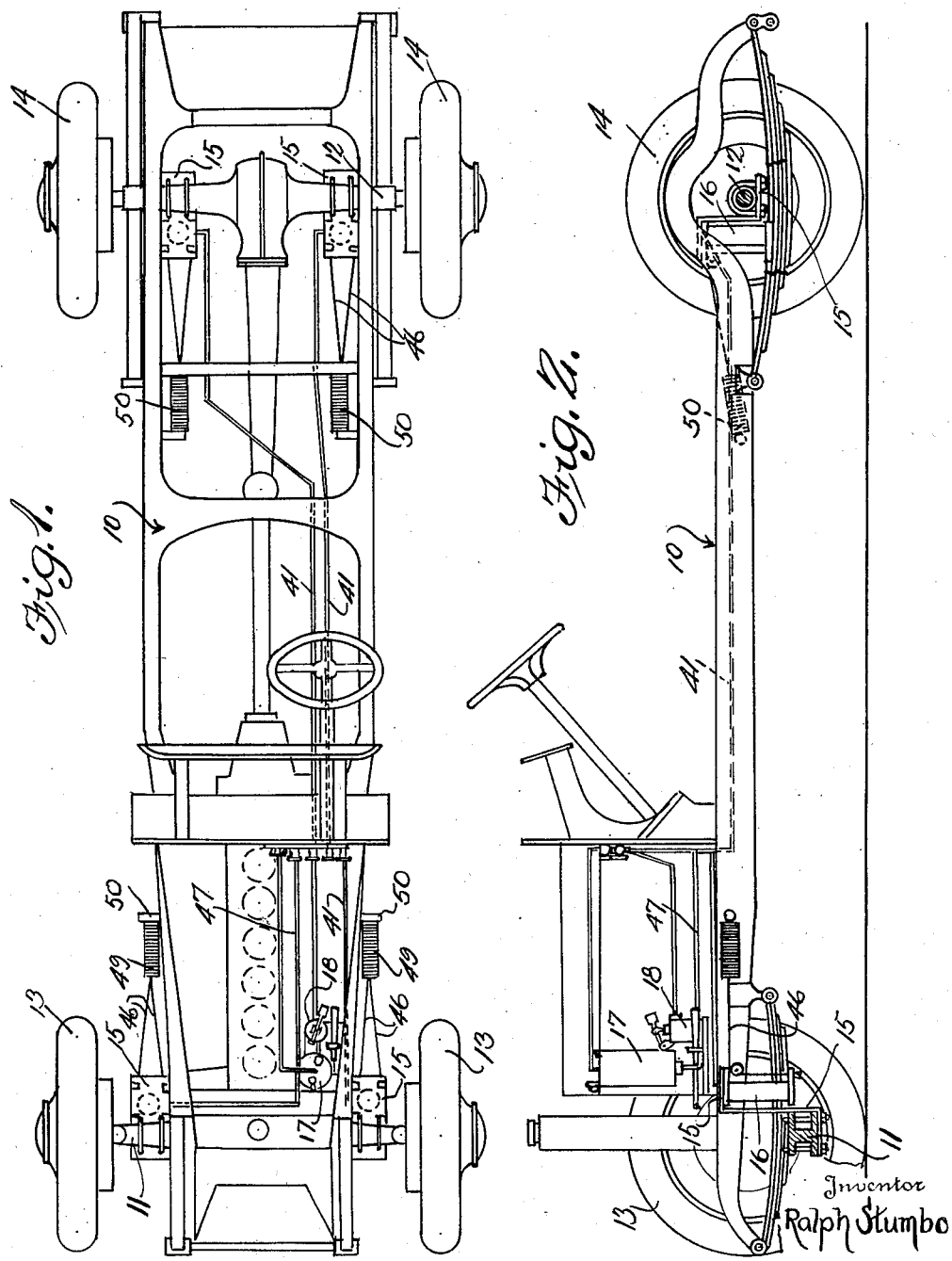

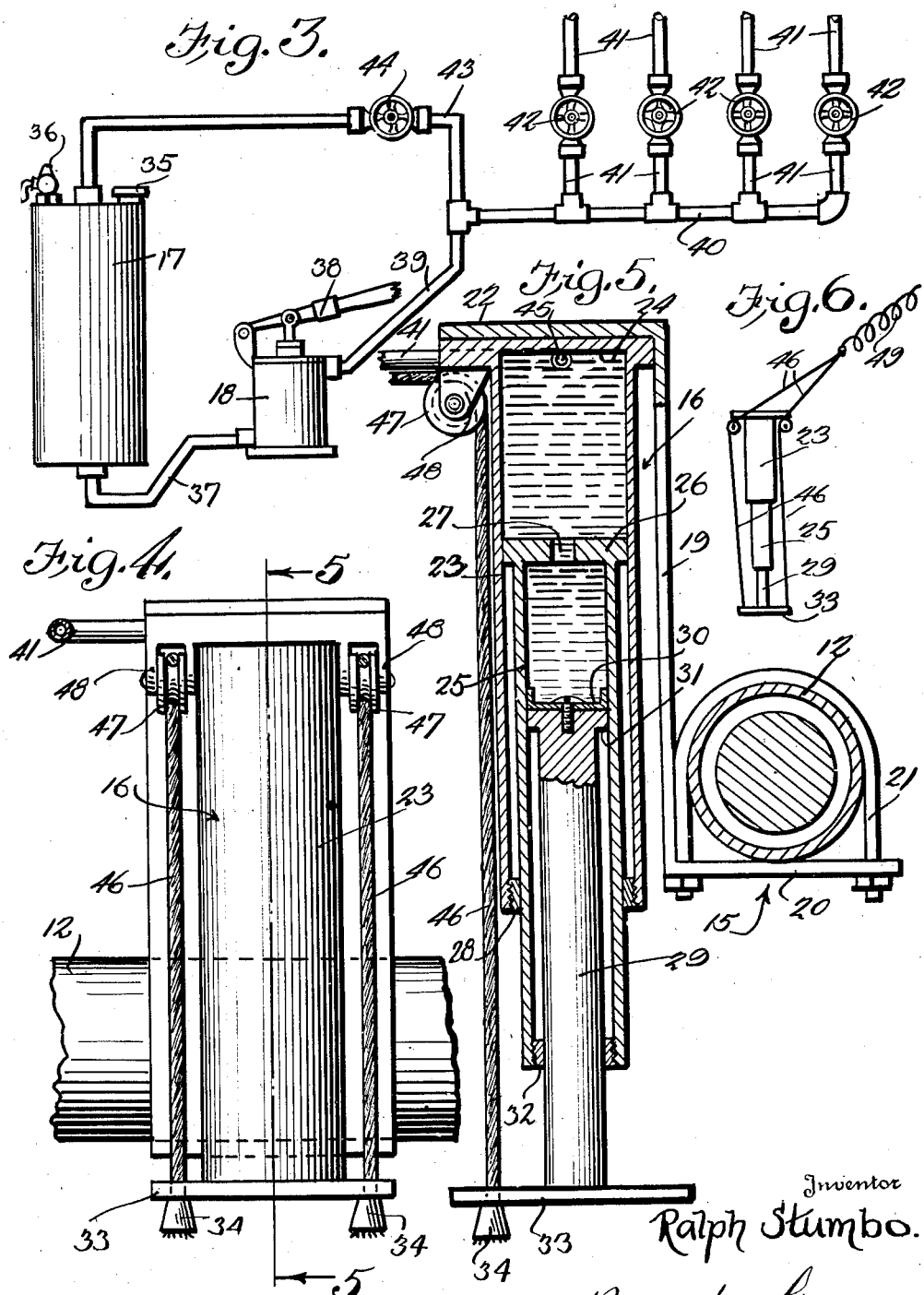

1,995,782

UNITED STATES PATENT OFFICE 1,995,782

HYDRAULIC JACK FOR MOTOR VEHICLES

Ralph Stumbo, Bronx, N. Y.

Application November 16, 1934, Serial No. 753,389

2 Claims. (Cl. 254—86)

This invention relates to certain new and useful improvements in hydraulic jacks for motor vehicles.

The primary object of the invention is to provide a motor vehicle with hydraulic jacks, one associated with each wheel and adapted for selective or joint operation for the raising of a wheel or wheels from the ground for purposes of tire or wheel repair or the like.

A further object of the invention is to provide a hydraulic jack of the foregoing character wherein the jack embodies a series of telescoping piston sections that are projected by fluid pressure with a novel construction of spring mechanism for retracting the piston sections to inoperative position within the jack casing when the motor vehicle wheel has been lowered to ground contact.

It is a further object of the invention to provide a novel form of bracket mounting for the jack associated with each wheel for positioning the jack at the desired elevation to avoid road obstructions.

With the above and other objects in view that will become apparent as the nature of the invention is better understood, the same consists in the novel form, combination and arrangement of parts hereinafter more fully described, shown in the accompanying drawings and claimed.

In the drawings:—

Figure 1 is a top plan view of a motor vehicle chassis with the hydraulic jacks and operating mechanism therefor in position thereon;

Figure 2 is a side elevational view of the motor vehicle chassis;

Figure 3 is an elevational view of the pump mechanism, fluid supply tank and pipe lines leading to the jacks associated with each wheel;

Figure 4 is an elevational view of one of the jacks in its retracted position;

Figure 5 is a vertical cross-sectional view taken on line 5—5 of Figure 4, showing the piston element of the jack in extended position and the bracket mounting for the jack; and Figure 6 is a diagrammatic view of one of the jacks with the spring device associated therewith for retracting the piston element into inoperative position.

Referring more in detail to the accompanying drawings, and particularly to Figures 1 and 2, the reference character 10 designates in general the chassis of a motor vehicle having front and rear axles 11 and 12 respectively carrying front and rear wheels 13 and 14. A bracket plate 15 is secured to each axle end inwardly of the adjacent wheel and carries a jack 16. The jacks are hydraulically operated and have fluid delivered thereto under pressure through a system of piping that includes a fluid tank 17 for delivering fluid to the pump 18 which in turn forces the fluid through the piping selectively to the jacks.

The bracket 15 for supporting each jack is shown more clearly in Figures 4 and 5 and comprises a vertically disposed plate 19 having a foot 20 bent at right angles thereto to underlie the axle 12 as shown and be secured thereto by tie members 21. A head 22 is carried by the upper end of the vertical wall 19 and extends at right angles therefrom in a direction opposite to the foot 20, with the upper end of the jack 16 secured to the underside of the head 22 in any convenient manner. The design of bracket 15 positions jack 16 when in inoperative position at the desired elevation to clear road obstructions.

The jack 16 as shown in Figures 4 to 6 comprises a cylinder casing 23 having a closed upper end 24 secured to the head 22 of the bracket 15 and open at its lower end. A hollow piston element 25 is reciprocably mounted in the cylinder casing 23 and is provided with a head 26 at its upper end that peripherally moves in contact with the inner wall of the cylinder casing 23 and said head 26 is provided with an axial opening 27 to form communication between the cylinder casing and hollow piston element. A screw ring 28 is threaded into the lower end of the cylinder casing 23 to be engaged by the head 26 of the hollow piston for limiting outward movement of the hollow piston relative to the cylinder casing. A cylindrical and solid piston element 29 is reciprocably mounted in the hollow piston 25 and carries a gasket 30 at its upper end that moves in wiping contact with the inner wall of the hollow piston 25, the upper end of the piston element 29 being provided with a head defining a shoulder 31 adapted to be engaged with the screw ring 32 threaded into the lower open end of the hollow piston 25 for limiting projecting movement of the piston element 29. A base plate 33 is carried by the lower end of the piston element 29 and has ground engaging feet 34 depending therefrom.

The hydraulic mechanism for the operation of the jacks 16 as shown in Figures 1 and 2 is conveniently located in proximity of the engine of the motor vehicle and beneath the hood thereof and as shown in Figure 3, the fluid tank 17 is provided with a filler opening closed by a cap 35 and further provided with a vent 36. A pipe 37 forms communication between the lower end of the tank 17 and the pump 18. The pump 18 is manually operated by means of the handle 38 and the floated pipe 39 leading from the pump 18 communicates with a manifold pipe 40 with which branch pipes 41 are connected for selectively delivering the fluid under pressure from the pump 18 to the desired jack 16 and under control of the manually operable valves 42. The several valves 42 may be conveniently supported on the dash board of the motor vehicle beneath the hood for accessibility and manipulation. A return pipe for the fluid in the pipe lines 41 and jacks 16 to the tank 17 is shown at 43 in Figure 3 and forms communication between the manifold 40 and upper end of the tank 17, this return pipe 43 being provided with a relief valve 44.

When it is desired to elevate any one of the front or rear wheels 13 or 14 from the ground or for the joint elevation of two or more wheels, the relief valve 44 in the return pipe 43 is closed and the desired valves 42 in the supply pipes 41 to the jacks opened. The pump 18 is then operated by the handle 38 to draw the fluid from the tank 17 therethrough and force the same under pressure to the pipe 39, manifold 40 and through the desired pipe line 41 to the jacks 16. The fluid enters the upper end of the cylinder casing 23 at the point 45 above the head 26 of the hollow piston element 25 for lowering the latter as shown in Figure 5 and to flow through the opening 27 in the head 26 for engaging the head of the piston element 29, the two piston elements 25 and 29 being telescopically extended as illustrated. When it is desired to hold the car wheel and to retract the piston elements 25 and 29 into the cylinder casing 23, the relief valve 44 is opened and the fluid returns from the jack through the pipe 41, manifold 40 and pipe 43 to the upper end of the tank 17.

To aid the return of the piston elements 25 and 29 to their retracted and housed positions within the cylinder casing 23 as shown in Figure 4, a combination cable and spring arrangement is provided and comprises a pair of cables 46, each anchored at one end to the base plate 33 of the piston element 29 and trained over guide pulleys 47 journalled in bracket arms 48 depending from the top wall 24 of the cylinder casing 23, the cables 46 then being horizontally directed as shown in Figure 2 and converging for joint attachment to one end of a coil spring 49 that is anchored at its other end as at 50 to a part of the motor vehicle chassis 10. This arrangement of cable and spring retraction for the piston elements is diagrammatically illustrated in Figure 6. When the piston elements are projected, the spring 49 is placed under tension and this tension spring then acts through the medium of the cables 46 to retract the piston elements 25 and 29 into the cylinder casing 23 as will at once be evident from an inspection of Figure 6. The contracting of the spring 49 also acts to return the fluid in the jacks to the tank 17.

From the above detailed description of the invention it is believed that the construction and operation thereof will at once be apparent and while there is herein shown and described the preferred embodiment of the invention, it is nevertheless to be understood that minor changes may be made therein without departing from the spirit and scope of the invention as claimed.

I claim:—

1. In hydraulic jacks for motor vehicles, a jack associated with each wheel, manually controlled fluid pressure means for the jacks, each jack comprising a series of telescoping piston elements and cooperating cable and spring devices for each jack positioned exteriorly of the jacks for retracting the piston elements and forcing the fluid out of the jacks, the cables being connected to the outer end of the inner piston element, guide pulleys for the cables carried by the upper end of the jack and the spring having one end thereof anchored to the vehicle with the cables connected to the other end.

2. In hydraulic jacks for motor vehicles, a jack associated with each wheel, manually controlled fluid pressure means for the jacks, each jack comprising a series of telescoping piston elements and cooperating cable and spring devices for each jack positioned exteriorly of the jacks for retracting the piston elements and forcing the fluid out of the jacks, the cables being connected to the outer end of the inner piston element, guide pulleys for the cables carried by the upper end of the jack and the spring having one end thereof anchored to the vehicle with the cables connected to the other end, and an angular bracket for the support of each jack having one end anchored to the axle and projecting above the axle with the jack secured to the upper end of the bracket for elevating the jack out of the path of ground obstructions.

RALPH STUMBO.